July 22, 1952     C. F. MARTINETZ     2,604,349
NONINTERLOCKING AUTOMOBILE BUMPER
Filed Aug. 24, 1949     2 SHEETS—SHEET 2
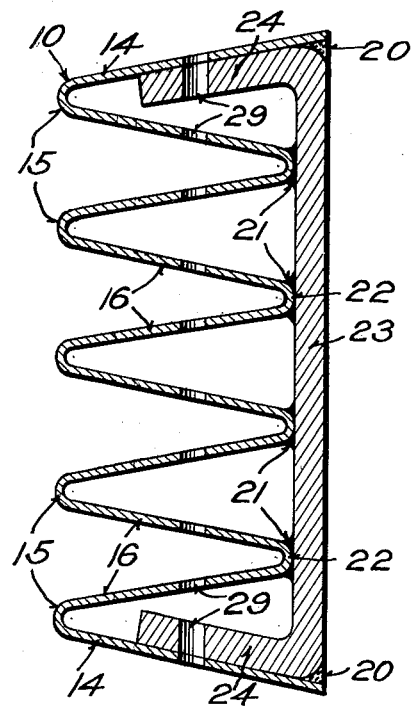
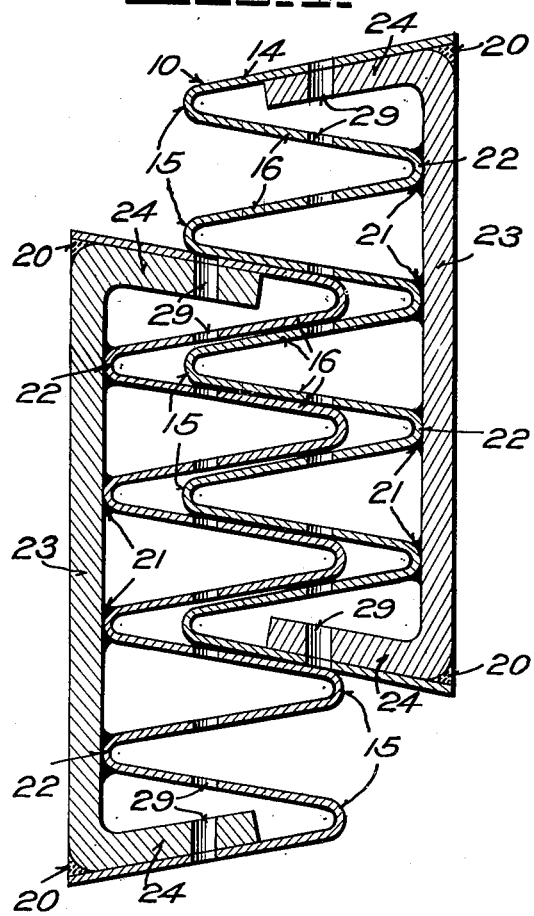
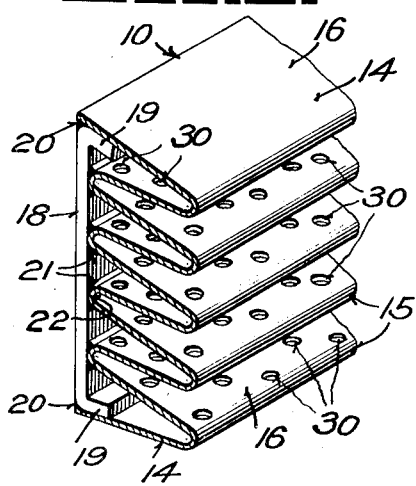
INVENTOR.
CHARLES F. MARTINETZ,
BY
H. B. Wilson & Co.
ATTORNEYS

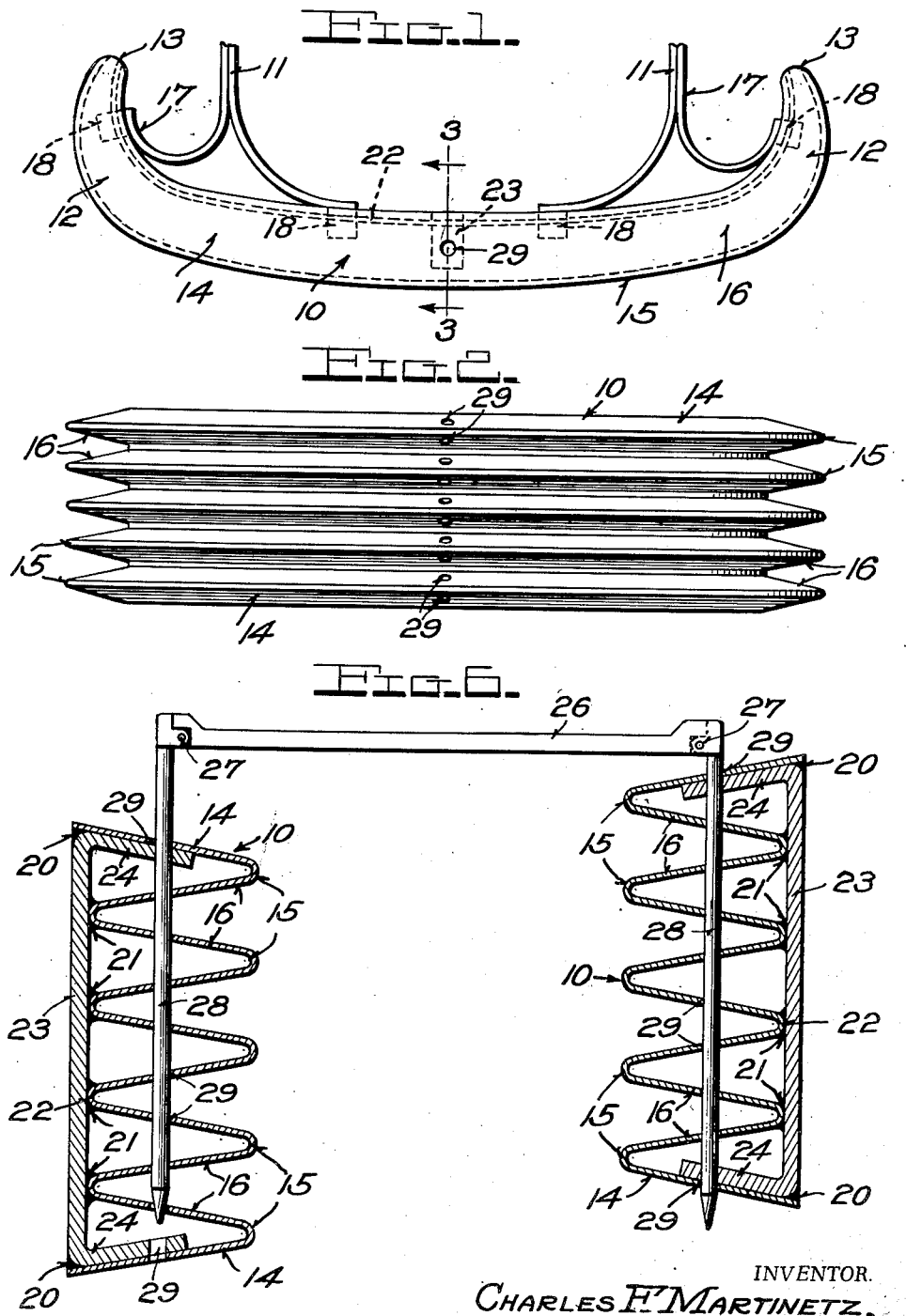

Patented July 22, 1952

2,604,349

UNITED STATES PATENT OFFICE 2,604,349

NONINTERLOCKING AUTOMOBILE BUMPER

Charles F. Martinetz, New York, N. Y.

Application August 24, 1949, Serial No. 112,101

5 Claims. (Cl. 293—70)

1

My invention relates to impact bumpers used at the front and rear of motor vehicles, and more particularly to a bumper of this character which will be non-interlocking and which will facilitate the pushing or towing of one automobile by another.

Most automobiles are equipped with front and rear bumpers each having one or more horizontal impact bars which are disposed at varying distances from the road surface in different makes of cars. Collisions involving the locking of such bumpers on two cars during driving, backing, stopping short, skidding and parking frequently occur; and to reduce the tendency of the bumper bars overriding or underriding each other and becoming locked, it has been common to provide such bars with vertical cross-pieces or uprights of varying sizes. While such uprights tend to prevent or reduce the locking of bumpers when one car is moving in a forward or rearward direction relative to the other, they are ineffective in preventing the hooking together of the bumpers when the two cars are positioned at angles to each other as in backing into or pulling out of a restricted parking space. When such uprights or guards are large they tend to hide or mar the appearance of the ornamental grill-work at the front of the car and to interfere with the free use of the luggage compartment at the rear.

It is an object of this invention to provide bumpers of such construction that they will not wedge into each other or interlock and will have a tendency to bounce apart particularly when they strike each other in a forward and rearward direction.

Another object is to provide bumpers, which if interengaged, in either parallel or angular relations, will readily separate under the power of either of the motor vehicles.

Another object is to provide bumpers which cannot interfere or hook into each other and lock even if the two vehicles are angularly related when the bumpers come into sideway engagement with each other, as often happens with prior art bumpers when a car is being parked between closely spaced cars along a curb, or when a car is pulling out from such a parking or from closely spaced stalls in public garages or parking lots.

Another object is to provide bumpers which will interengage without locking into each other even if the bumpers on the two cars have widely different mounting levels, so that one car may push another without fear of the two cars be-

2 coming locked or, in other words, the bumpers will not override or underride each other.

Further objects and advantages of the invention will in part be obvious and in part pointed out hereinafter.

With the foregoing in view the invention resides in the novel combination and arrangement of parts and in the novel features of construction hereinafter described and claimed, and illustrated in the accompanying drawing in which:

Fig. 1 is a top plan view of the improved bumper,

Fig. 2 is a front elevation,

Fig. 3 is a vertical section on line 3—3 of Fig. 1.

Fig. 4 is a view similar to Fig. 3 but showing the manner of collision or impact engagement of the bumper on two motor vehicles when the bumpers are mounted at different distances from the surface of the roadway.

Fig. 5 is a detail sectional perspective showing a modification, and

Fig. 6 is a vertical section through the bumpers, also of different mounting levels on two cars showing them connected by a foldable towing bar.

In the present preferred embodiment of the invention shown in the drawings, the numeral 10 denotes the body of the bumper which is supported horizontally across an end of the automobile by resilient supporting arms or brackets 11 and 17 carried by the chassis or other portion of the vehicle. While the major portion of the body 10 may be straight, it is preferably given a slight longitudinal curvature when viewed from the top as seen in Fig. 1, but its two end portions 12 are arcuately or longitudinally curved in the same direction toward the wheel fenders or mud guards. These curved ends 12 are also tapered longitudinal when viewed from the top and terminate in rounded extremities 13 which are disposed close to the outer sides of the fenders. The bumper at the front of the automobile is preferably shaped as seen in Fig. 1, and while the same shape may be used at the rear of the vehicle, the rear bumper may have the curved end portions of greater length so that they extend forwardly along the rear fenders to a greater extent.

The bumper body 10 includes a vertical series of spaced parallel impact bars 14 which extend from its center to its extremities 13. The spaces between these bars 14 are closed and free from any projections so that an old style bumper bar cannot be hooked or locked to the body 10, see Fig. 2. In the present preferred construction, the body 10, in Fig. 3, is formed from a single sheet or plate of metal of suitable gauge such as from three to five thirty-seconds of an inch in thickness. It may be of cold rolled or cold drawn steel rolled and/or pressed to shape with suitable forming dies. When the body 10 is thus formed the bars 14 are V-shape in cross-section, these bars having a rounded outer longitudinal edge 15 from which diverge the angularly related upper and lower walls or plates 16 that close the spaces between the rounded edges 15. The pressure angle between the plates 16 of adjacent bars is preferably 20° although it may be less or as great as 30°. It is an essential feature of my invention that the included angle between the plates 16 of next adjacent impact bars be acute and within the range above stated because I have discovered from tests that if the included angle is too small the bumper bodies will wedge or stick together and if too large they will override and not hold. It will be noted that the plates 16 have a width that is much greater than the vertical spacing of the rounded front edges of the bars and hence the spaces or channels between adjacent bars are deep. That insures against overriding when two bumpers come into engagement; and since all of the bumper bars are of the same size and shape and are uniformly spaced and in vertical alinement, at least some of the bars of one bumper will interengage at least some of the bars of the other when two similar bumpers come together either at angles to each other or in parallel relation. As shown the bumper body has five of these V-shaped or acute angular surface type slats or bars 14, but a lesser or greater number may be used. It is believed that five will take care of the bumper mountings on the various makes of automobiles and hence the old style bumper bars will always strike some portion of the body 10 and when two of the latter engage each other one or more of the V-shaped bars 14 of one bumper will enter one or more of the spaces between the bars of the other. Such interfitting or inter-engaging of two of the bumpers mounted at different road clearance levels on two cars, is shown in Fig. 4. It will be seen that the two bumpers cannot override or underride each other, or become locked to each other and hence the cars may be separated by their own power. Due to the shape of the bars and the resiliency of the steel plate from which the body is formed, there will be tendency for the two bumpers to spring apart immediately after they collide; and such separation will also be aided by the resilience of the mounting arms 11 and 17. The rounded edges 15 of the bars will have a tendency to guide the bars of two bumpers into interengagement. It will be noted that the V-shaped channels formed between the impact bars are of substantially the same size and shape as the bars, and that the plates 16 forming the bars will cause one or more of the bars on one bumper to be guided into and centered in one or more of the channels of an opposed bumper body as seen in Fig. 4.

Due to the curvature of the portions 12 and 13 of the V-shaped bars or slats 14, it will be seen that there is no likelihood of these bumpers on two cars hooking into each other and becoming locked even when the cars are angularly related when the bumpers contact each other, as frequently happens when a car enters or leaves a restricted parking space or when skidding occurs.

For the purpose of reenforcing the bumper body I preferably employ a suitable number of upright heavy, rigid steel straps or braces 18, at the rear or inner side of the body 10, and some of these may be used to connect the body 10, to the supporting arms 11, 17. As shown the arms have oppositely curved portions the ends of which may be welded or otherwise secured to the steel straps or braces 18, and the latter may be similarly secured to the body 10 at spaced points. Any number of the steel straps 18 may be used. The rectangular steel straps 18 as seen in Figs. 1 and 5 have angularly bent ends 19 welded at 20 to the upper and lowermost plates 16 and to their intermediate portions are welded as at 21 the connected inner portions 22 of the plates 16.

At the center of the body 10 I provide a similar steel strap or brace 23 which has longer bent ends 24, as seen in Figs. 1 and 3, used to reenforce openings for the connection of a foldable steel towing bar as shown in Fig. 6. This towing bar comprises a body 26 to the ends of which are hinged as at 27 two pins 28 having pointed free ends. The pins 28 when folded are parallel with the body bar and the hinged connections 27 are shouldered so that the pins cannot swing beyond positions at right angles to the body bar. Formed vertically through the ends 24 and the plates 16 are aligned vertical openings 29 adapted to receive one of the pins 28. It will be seen that when one car is to tow another, the two pins may be dropped into the openings 29 in the two bumpers as shown in Fig. 6, it being immaterial as to the relative horizontal positions of the two bumpers.

For the purpose of reducing wind resistance and to permit cooling air to pass through the front bumper to the radiator, the body 10 may be formed with small openings or perforations 30 as shown in Fig 5. Any size, number and arrangement of such openings 330 may be employed and the metal plate from which the body 10 is formed may be perforated prior to shaping it to form the finished bumper body.

By making the bumper body of a single metal sheet by bending it back-and-forth upon itself to produce the deep corrugations, an extremely strong structure is provided, that is relatively light in weight and may be economically produced. By closing the spaces between the edges of the impact bars and having the latter curved at their ends to extend around the wheel fenders, two bumpers cannot become locked or hooked together; cannot over or underride; and no matter how they may be inter-engaged they will readily separate when one car is moved away from the other. The structure also has the advantages previously mentioned.

From the foregoing, taken in connection with the accompanying drawing, it will be seen that novel and advantageous provision has been made for carrying out the object of the invention, and while preferences have been disclosed, attention is invited to the possibility of making variations within the scope of the invention as claimed.

I claim:

1. In a motor vehicle bumper for yieldable mounting transversely across the end of a vehicle, a body composed of a series of spaced vertically-alined horizontally-extending impact bars of V-shape in cross-section all of the bars being of uniform size and uniformly spaced, each bar consisting of upper and lower metal plates arranged at acute angles in outwardly converging relation with their outer longitudinal edges united, the inner longitudinal edges of the plates of next adjacent bars being also united to provide between next adjacent bars similar acute-angled inwardly-closed V-shaped channels of substantially the same size and shape as said bars, said plates having a width greater than the vertical spacing between the front edges of the bars, the depth of the channels, the width of the bars and the spacing of the latter being such that when two bumpers of the same size and shape on two vehicles come together the bumpers will not override and the bar-forming plates on the two bumpers will guide and center at least some of the bars of each bumper in at least some of the channels of the other bumper without the bumpers becoming interlocked or tightly wedged together, and upright bracing means at the rear side of said body fastened to said united inner longitudinal edges of said plates to hold the inner portions of said bars in rigidly spaced relation.

2. The structure of claim 1 in which the plates of next adjacent bars have an included angle between about 20° and about 30°.

3. The structure of claim 1 in which said upright bracing means comprises a plurality of vertically-disposed horizontally spaced flat metal straps with end portions projecting angularly in a forward direction from their upright portions, the latter being welded to said united inner longitudinal edges of the plates, the upper angular end portions of said straps being inclined downward and welded to the under face of the downwardly inclined upper plate of the uppermost bar and the lower angular end portions of said straps being inclined upwardly and welded to the upper face of the upwardly inclined lower plate of the lowermost bar.

4. The structure of claim 1 in which said body is formed from a single sheet of resilient metal bent back-and-forth upon itself to form said impact bars, and in which the end portions of said bars are longitudinally curved into arcuate shape to extend along the outer sides of the fenders of adjacent wheels of the vehicle to which the bumper is applied.

5. In a motor vehicle bumper for yieldable mounting across an end of a vehicle, a body formed from a single sheet of resilient metal shaped to provide a plurality of spaced vertically-alined horizontally-extending impact bars of V-shape in cross section, said bars having their ends tapered to reduce their width and longitudinally curved to provide arcuate end portions to extend along the outer sides of the fenders of adjacent wheels of the motor vehicle to which the bumper is applied, each of said bars consisting of upper and lower plates arranged at acute angles in outwardly converging relation with their outer longitudinal edges united by integral curved portions, the inner longitudinal edges of the plates of next adjacent bars being also united by integral curved portions to provide between next adjacent bars similar acute-angled inwardly-closed V-shaped channels of substantially the same size and shape as said bars, said plates having a width greater than the vertical spacing between the front edges of the bars, the plates of next adjacent bars having an included angle between about 20° and about 30° so that when two bumpers of the same size and shape on two vehicles come together the bumpers will not override and the bar-forming plates on the two bumpers will guide and center at least some of the bars of each bumper in at least some of the channels of the other bumper without the bumpers becoming interlocked or tightly wedged together, and means on the inner side of the bumper rigidly connecting said curved portions which unite the inner longitudinal edges of the bumper plates to rigidly hold the inner portion of the impact bars in spaced relation.

CHARLES F. MARTINETZ.

REFERENCES CITED

The following references are of record in the file of this patent:

UNITED STATES PATENTS

| Number | Name | Date |
|---|---|---|
| 2,078,679 | Golphin | Apr. 27, 1937 |
| 2,104,182 | Best | Jan. 4, 1938 |
| 2,147,745 | MacKinnon | Feb. 21, 1939 |
| 2,492,914 | Barden | Dec. 27, 1949 |